United States Patent [19]

Duda

[11] Patent Number: 5,708,710
[45] Date of Patent: Jan. 13, 1998

[54] METHOD AND APPARATUS FOR AUTHENTICATION IN A COMMUNICATION SYSTEM

[75] Inventor: Michael C. Duda, Naperville, Ill.

[73] Assignee: Motorola, Inc., Schaumburg, Ill.

[21] Appl. No.: 493,951

[22] Filed: Jun. 23, 1995

[51] Int. Cl.⁶ .................................................. H01L 9/08
[52] U.S. Cl. ........................................... 380/21; 380/25
[58] Field of Search ............................ 380/21, 25, 44; 455/33.1

[56] References Cited

U.S. PATENT DOCUMENTS

| 5,091,942 | 2/1992 | Dent | 380/44 |
| 5,153,219 | 10/1992 | Reeds, III et al. | 380/21 |
| 5,404,404 | 4/1995 | Novorita | 380/21 |
| 5,455,863 | 10/1995 | Brown et al. | 380/25 |
| 5,461,217 | 10/1995 | Claus | 380/21 |
| 5,513,245 | 4/1996 | Mazikovsky et al. | 380/21 |
| 5,594,795 | 1/1997 | Dent et al. | 380/21 |
| 5,598,459 | 1/1997 | Haartsen | 455/33.1 |

*Primary Examiner*—Salvatore Cangialosi
*Attorney, Agent, or Firm*—Donna Rogers Maddox

[57] ABSTRACT

A method and apparatus for performing authentication in a communication system. The method includes the steps of detecting an unexpected authentication message, updating a counter value, comparing the counter value to a threshold value, and performing an encryption key update operation in response to the comparison between the counter value and the threshold value. The apparatus includes a base station (152), a switching center (128) coupled to the base station (152), and an authentication center (149) responsive to the switching center (128). The switching center (128) detects an unexpected authentication message received by the base station (152). The authentication center (149) updates a counter when the switching center (128) detects the unexpected authentication message and compares the updated counter with a threshold value. The authentication center (149) initiates an encryption key update operation when the updated counter value exceeds the threshold value.

16 Claims, 3 Drawing Sheets

METHOD AND APPARATUS FOR AUTHENTICATION IN A COMMUNICATION SYSTEM

RELATED PATENT APPLICATIONS

The present application is related to commonly assigned U.S. patent application Ser. No. 08/084,664 to Brown et al. and filed Jun. 29, 1993, now U.S. Pat. No. 5,455,863 which is expressly incorporated herein by this reference.

FIELD OF THE INVENTION

The present invention relates generally to communication systems and, more particularly, to authentication within communication systems.

BACKGROUND OF THE INVENTION

Many communications systems currently use authentication and encryption to enhance security of the systems. These communication systems include cellular radio telephone communication system, personal communication systems, paging systems, as well as wireline and wireless data networks. By way of example a cellular communication system will be described below; however, it will be appreciated by those skilled in the art that the authentication and encryption techniques described can be readily extended to other communication systems without departing from the scope and spirit of the present invention. Turning now to cellular communication systems, these systems typically include subscriber units (such as mobile or portable units or terminals) which communicate with a fixed network communication unit via radio frequency (RF) communication links. A typical fixed network communication unit includes at least one base station (i.e., communication unit) and a switching center.

One responsibility of the fixed network communication unit is to grant use of the communication system to the subscriber unit after the requesting subscriber unit meets the authentication requirements of the system. In a typical cellular telephone communication system, each subscriber unit is assigned a telephone number (mobile identification number) (MIN) (hereinafter referred to as a first subscriber unit identifier) and an identification number (or serial number) (SN) (hereinafter referred to as a second subscriber unit identifier) which uniquely identifies the subscriber to any fixed network communication unit. Each subscriber unit has a unique identification number that distinguishes it from other subscriber units. The fixed network communication unit has access to these identification numbers through a database. Often these numbers are used by the fixed network communication units to bill subscribers for the time the subscriber uses the system.

A limitation of cellular systems is that a fraudulent user may detect a legitimate subscriber's identification number by RF eavesdropping or by purposeful or inadvertent divulgence of the MIN/SN combination by the radio telephone installer. Once the subscriber's telephone number and identification number is known (stolen), a thief may reprogram another subscriber unit with the stolen identification number causing two or more subscriber units to have the same MIN/SN combination. Although cellular radio telephone systems have authentication procedures to deny access to subscribers not having legitimate identification numbers, these systems do not have the capability to detect multiple users with the same identification number. Consequently, the legitimate user is billed for both the thief's use and his own use.

Several authentication techniques are known in the art. One such technique is presented by the Electronic Industries Association (EIA) Standard EIA-553 and is available from EIA at 2001 Eye Street, N.W., Washington, D.C. 20006. EIA-553 specifies that each subscriber shall have a MIN and a factory set SN. The telephone number which the subscriber is attempting to contact is the data that is transmitted by the subscriber to the fixed network communication unit. Authentication is granted by this system if the MIN and corresponding SN are found in the fixed network communication unit database. Unfortunately, EIA-553 does not require the encipherment of the MIN or SN before transmission to the fixed network communication unit thereby permitting direct RF detection of any MIN or SN.

Another example of a conventional authentication technique is described in the United States Digital Cellular (USDC) and time division multiple access (TDMA) standards known as Interim Standard (IS) IS-54 and IS-55. The USDC authentication technique utilizes a series of specialized messages which are passed between the subscriber unit and a communication unit of the communication system before system access is granted. The USDC technique employs a "global challenge" on the common signaling channel (e.g., a random access channel or a pilot channel) and utilizes shared secret data (SSD) (i.e., encrypting keys known to a subscriber unit and a communication unit which form a communication link) for an authentication and a voice privacy function. The initial transmitted subscriber message contains an authentication response, but no other data is encrypted. The command to begin an encryption process is sent from the service provider to the subscriber after the subscriber has been assigned a traffic channel.

A problem with conventional authentication techniques such as the "global challenge" system used in USDC is that a fraudulent user may obtain a subscriber's encryption key by sending many challenge messages to either the subscriber unit or the fixed network to provoke response messages that may be recorded and later analyzed to derive an encryption key such as an SSD value. One method of solving this problem is to periodically update the SSD value before a fraudulent user has received enough information to derive the SSD value. However, the process of updating the SSD value is a costly process involving transmission of many messages between the subscriber unit and the fixed communication unit. Thus, it would be desirable to reduce the number of SSD updates while also providing a higher level of security against fraudulent users. Accordingly, there is a need for an improved method and apparatus for authentication in a communication system.

SUMMARY OF THE INVENTION

The present invention provides an improved method and apparatus for performing authentication in a communication system. The method includes the steps of detecting an unexpected authentication message, updating a counter value, comparing the counter value to a threshold value, and performing an encryption key update operation in response to the comparison between the counter value and the threshold value. Preferably, the encryption key is a shared secret data value or an A-Key value and the unexpected authentication message is preferably an unsolicited message, such as a base station challenge message or a unique challenge response message.

The apparatus for performing authentication includes a base station, a switching center coupled to the base station, and an authentication center responsive to the switching center. The switching center detects an unexpected authentication message received by the base station. The authentication center updates a counter when the switching center detects the unexpected authentication message and compares the updated counter with a threshold value. The authentication center initiates an encryption key update operation when the updated counter value exceeds the threshold value.

The invention itself, together with its attendant advantages, will best be understood by reference to the following detailed description, taken in conjunction with the accompanying drawings.

DETAILED DESCRIPTION

Figure 1:
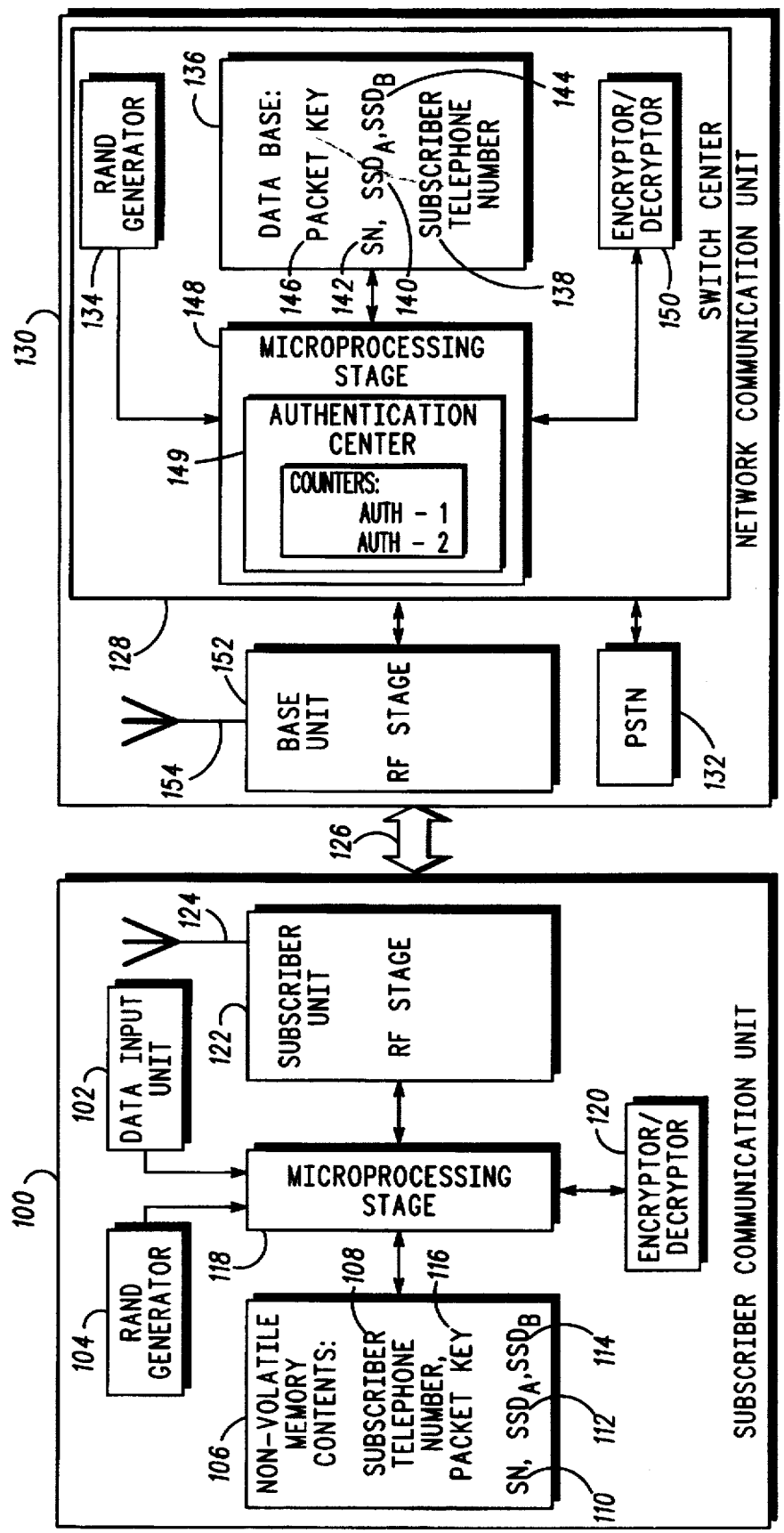
FIG. 1 is a block diagram showing a preferred embodiment of a communication system having a subscriber unit and a network communication unit in accordance with the present invention.

FIG. 1 generally depicts a subscriber communication unit 100 such as a subscriber telephone and a fixed network communication unit 130 such as a cellular telephone base site and switching center. The subscriber communication unit 100 is comprised of a microprocessing stage 118 which performs many of the preferred embodiment authentication and encryption steps by accessing a non-volatile memory unit 106 and a radio frequency (RF) stage 122. Additional elements which may be accessed by the microprocessing stage 118 include a data input stage 102 such as a key entry pad on a telephone (to enter a telephone number—data), voice, or other data to be transmitted, a random number generator 104 (for generating a random challenge), and an encryption/decryption device 120.

Within the non-volatile memory unit 106 resides the serial number 110 (for the subscriber unit), and the subscriber telephone number 108 (which can have, for example, characteristics of a Mobile Identification Number (MIN) and can be used as a first subscriber unit identifier). The serial number 110 is used as a second subscriber unit identifier which is known only to the subscriber unit and the fixed network unit. For example, it should not be available to an installer of the subscriber unit, it should only be available to a legitimate user of a subscriber unit and a fixed network communication unit database. These identifiers need not necessarily be numbers but may correspond to any attribute capable of being identified by the fixed network communications unit. An alternative embodiment, for example, in a cellular system, may include a stored look up table containing multiple sets of serial numbers, and telephone numbers with each set of identifiers corresponding to a specific cellular area or fixed network communication unit. The memory unit 106 also serves as a storage location for keys generated by the encryption/decryption device 120. These keys may include first shared secret data 112 ($SSD_A$), second shared secret data 114 ($SSD_B$), and third shared secret data 116 (i.e., a packetized data key).

The network communication unit 130 includes a switching center 128 which is comprised of a microprocessing stage 148 which, like the subscriber unit 100, operates in conjunction with a database 136 and a link to a base site radio frequency stage 152 to perform authentication and encryption processes. In the preferred embodiment the microprocessor stage 148 includes an authentication center 149. Alternatively, the authentication center 149 could be located in a separate processor in the switch center 128 or in an independent unit in communication with the fixed communication unit 130. Additional elements accessed by the microprocessing stage 148 include a random number generator 134 and an encryptor/decryptor 150. Additionally, the switching center 128 has an interface to the Public Switched Telephone Network (PSTN) 132. The PSTN link can be used for "visited" switching center to "home" switching center communications as required for authentication and billing of roaming subscriber units.

The database includes information regarding several subscriber units such as a serial number 140 and the associated subscriber telephone number 138 as well as keys associated with the telephone number 138 which may be generated by the encryption/decryption device 150 or received from a "home" switching center. These keys may include first shared secret data 142 ($SSD_A$), second shared secret data 144 ($SSD_B$), and third shared secret data 146 (i.e., a packetized data key). Communication between the subscriber communication unit 100 and the fixed network communication unit 130 is accomplished via RF transmissions 126 between antennae 124 and 154, respectively, of the two units in accordance with well understood cellular system techniques.

Figure 2:
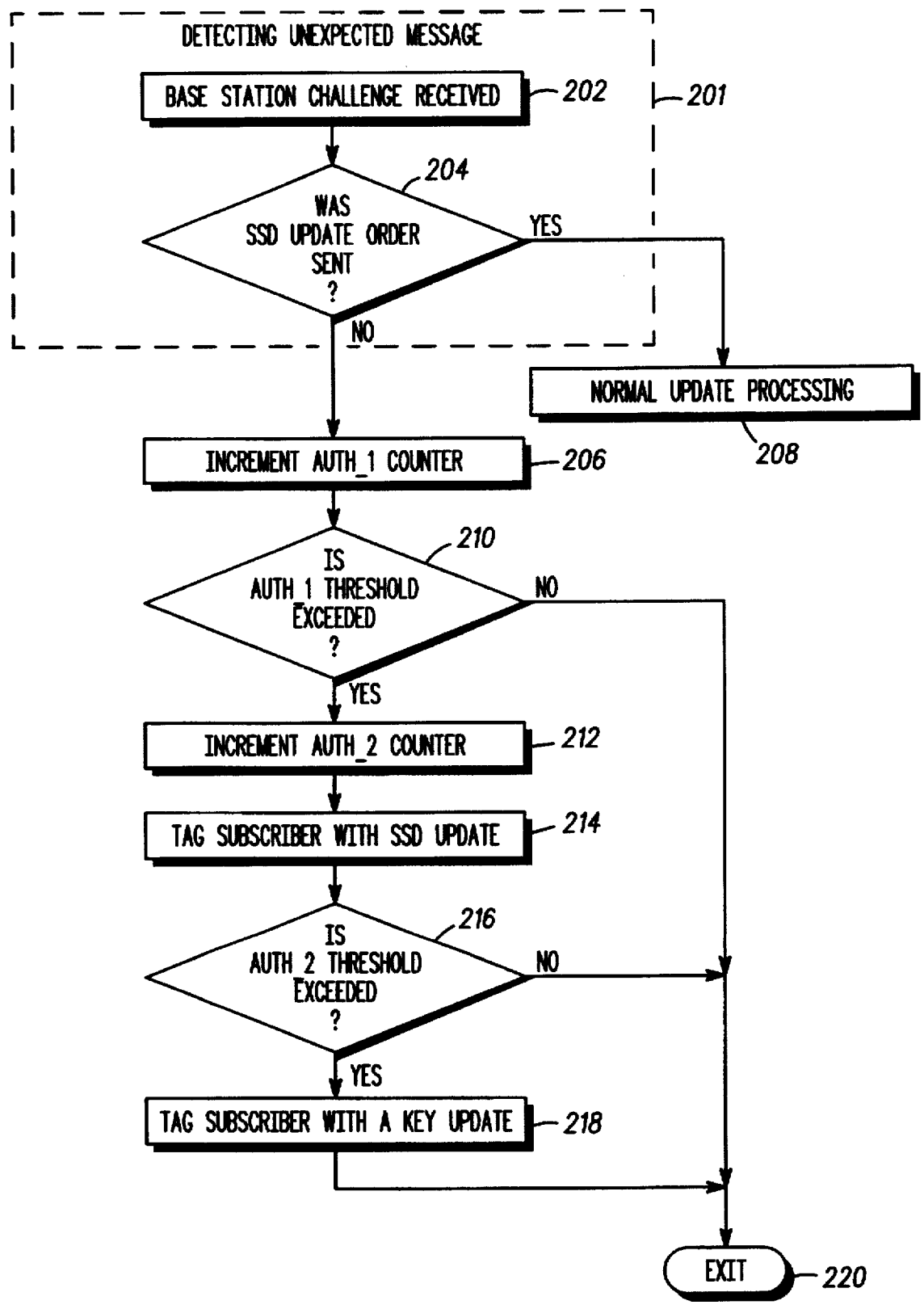
FIG. 2 is a flow chart of an authentication method used upon receipt of a base station challenge message by the network communication unit of FIG. 1 in accordance with a preferred embodiment of the present invention.

A method of performing detection of an unexpected authentication message in the authentication center 149 according to a preferred embodiment is illustrated in FIG. 2. When a base station challenge message is received, at 202, a check is made, at 204, to determine whether a previous SSD update order was sent by the fixed communication unit 130. If a previous update order was sent, then normal authentication processing continues at 208. Otherwise, an unexpected and unsolicited message has been received at 201 and in response a first internal counter (AUTH_1) is incremented at 206. The first counter (AUTH_1) keeps a count of the number of unexpected messages have been detected. The first counter is then compared to a first threshold at 210. The first threshold is preferably a predetermined number of detected unexpected messages allowed before updating the SSD key for the subscriber.

If the threshold value is not exceeded then no additional action is necessary and the process is exited at 220. However, if the first counter value exceeds the first threshold then processing continues at 212 where a second counter labeled AUTH_2 is incremented. Further, since the first counter exceeded the threshold value the process proceeds to initiate an update of the subscriber's SSD at 214. Next, the second counter AUTH_2 is compared with a second threshold at 216. Preferably, the second counter (AUTH_2) keeps a count of the number of SSD updates that have been performed for the subscriber. The second threshold value preferably represents the number of SSD updates allowed before updating a subscriber's A-key. If the second counter does not exceed the threshold value then processing ends at 220. However, if the second counter exceeds the second threshold value then the subscriber is tagged for an A-KEY update at 218, and the process is completed at 220.

Those skilled in the art will appreciate that the first threshold value and the second threshold value may be programmable so that an operator may adapt these values for a particular application. Preferably, the threshold value should be set at a level such that a fraudulent user cannot obtain enough information to derive an encryption key value. By setting the first threshold at such a level, the preferred embodiment provides protection against a fraudulent user who is sending many challenge messages to provoke response messages for later analysis since the SSD, or A-KEY, encryption key will be updated before the fraudulent user has enough response messages to determine the encryption key. In addition, the costly process of updating an SSD value is reduced since the SSD value is only updated when necessary to prevent fraudulent access. In this manner the method described with respect to FIG. 2 advantageously provides a flexible and efficient process for improving authentication by reducing the probability of fraud in the communication system.

Figure 3:
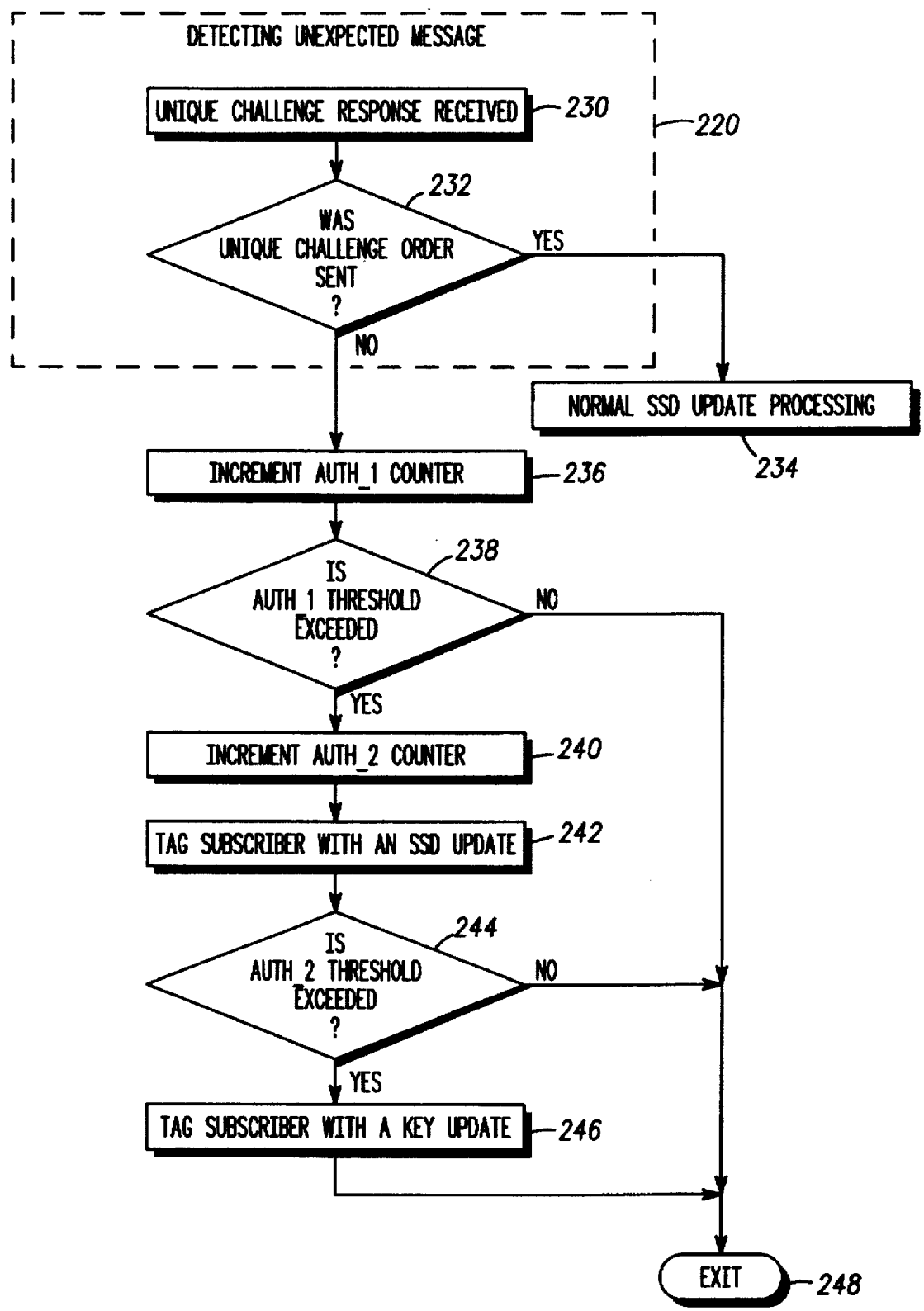
FIG. 3 is a flow chart of a preferred authentication method used upon receipt of a unique challenge message by the network change "Fixed network communication unit" to "network communication unit" throughout doc. communication unit of FIG. 1.

FIG. 3 illustrates a preferred method of performing authentication within the authentication center 149 with respect to detection of a unique challenge message by the base station 152 and the switch center 128. When a unique challenge response message is received, at 230, a check is made to determine whether a unique challenge order was previously sent at 232. If a unique challenge was previously sent then normal authentication and SSD update processing continues, at 234. However, if a unique challenge order was not previously sent, an unexpected and unsolicited message has been detected at 220. Processing then continues, at 236, by incrementing a first counter, labeled AUTH_1. The first counter is then compared to a first threshold value at 238. If the first threshold has been exceeded then processing continues, at 240, where a second counter labeled AUTH_2 is incremented.

Thereafter, the subscriber unit 100 is tagged for an SSD update at 242. Tagging a subscriber with an SSD update is similar to setting an internal flag, and will lead to further processing within the switch center 128 that will thereafter instruct the base station 152 to send appropriate messages over the air interface to the subscriber unit 100 so that the SSD value is updated within the subscriber unit 100. The specific details of the process of updating the SSD value depends on the actual air interface standard used between the subscriber unit 100 and the fixed communication unit 130 and is known in the art. Next, the second counter AUTH_2 is compared with a second threshold value at 244. If the second counter exceeds the second threshold value then the subscriber is tagged with an A-KEY update at 246. Otherwise, the process is completed at 248 without performing an A-KEY update.

Although only two unexpected messages have been described above, the base station challenge message of FIG. 2 and the unique challenge message of FIG. 3, those skilled in the art will appreciate that the techniques described herein may also be applicable to other unexpected or unsolicited messages within an authentication process used with a variety of particular air interfaces. In addition both FIGS. 2 and 3 illustrate a process where two separate counters are used. Those skilled in the art will understand that the present invention is not limited by the particular number of counters used. Also although the preferred embodiment refers to the SSD value and the A-KEY value, other encryption key data may alternatively be updated. Further, the present invention is suitable for use in a wide variety of wireless communication systems including code division multiple access, time division multiple access, and frequency division multiple access cellular systems.

In addition, further advantages and modifications will readily occur to those skilled in the art. For example, although the first and second counters are preferably a part of the authentication center the counters may instead reside in any of the other devices such as the base station or the switching center. In this case, the other device would compare the counter to a threshold and would notify the authentication center when the counter exceeded the threshold. The invention, in its broader aspects, is therefore not limited to the specific details, representative apparatus, and illustrative examples shown and described herein. Various modifications and variations can be made to the above specification without varying from the scope or spirit of the invention, and it is intended that the present invention cover all such modifications and variations provided they come within the scope of the following claims and their equivalents.

What is claimed is:

1. A method of performing authentication in a communication system comprising the steps of:

detecting an unexpected authentication message, said unexpected authentication message including but not limited to at least one of the following:

an unsolicited base station challenge message; and an unsolicited unique challenge response message;

updating a counter value;

comparing the counter value to a threshold value; and performing an encryption key update operation in response to the comparison between the counter value and the threshold value.

2. The method of claim 1, wherein the encryption key comprises shared secret data (SSD).

3. The method of claim 1, wherein the encryption key comprises an A-key value.

4. The method of claim 1 wherein the unsolicited base station challenge message comprises a received base station challenge message that is not in repose to prior encryption key update message.

5. The method of claim 1 wherein the unsolicited unique challenge response message comprises a received unique response message that is not in response to a prior unique challenge message.

6. The method of claim 1, wherein a plurality of unexpected authentication messages are detected and the counter value is updated in response to the detection of each of the plurality of unexpected authentication messages.

7. The method of claim 1, further comprising the steps of:

updating a second counter value;

comparing the second counter value to a second threshold value; and performing a second encryption key update operation in response to the comparison between the second counter value and the second threshold value.

8. An apparatus for performing authentication in a communication system comprising:

a base station receiving an unexpected authentication message, said unexpected authentication message including but not limited to at least one of the following:

an unsolicited base station challenge message; and an unsolicited unique challenge response message;

a switching center coupled to the base station;

a counter that is updated in response to the received unexpected authentication message; and an authentication center responsive to the switching center, said authentication center initiating an encryption key update operation when the counter exceeds a threshold value.

9. The apparatus of claim 8, wherein said authentication center is incorporated into the switching center.

10. The apparatus of claim 8, wherein the encryption key comprises shared secret data (SSD).

11. The apparatus of claim 8, wherein the encryption key comprises an A-KEY value.

12. The apparatus of claim 8 wherein the unsolicited base station challenge message comprises a received base station challenge message that is not in response to a prior encryption key update message.

13. The apparatus of claim 8, wherein the mobile switching center detects a plurality of unexpected authentication messages and the counter is updated in response to the detection of each of the plurality of unexpected authentication messages.

14. The apparatus of claim 8, wherein said communication system comprises a wireless communication system.

15. The apparatus of claim 14, wherein said wireless communication system comprises a system selected from the group consisting of a code division multiple access, a time division multiple access, and a frequency division multiple access cellular system.

16. A method of performing authentication in a communication system comprising the steps of:

receiving a base station challenge message at a base station;

determining whether the received base station challenge message is an unexpected authentication message by determining whether a prior shared secret data (SSD) update order was sent by the base station;

incrementing a first counter if the received base challenge message is an unexpected authentication message;

comparing the first counter to a first threshold value;

performing an SSD key update and incrementing a second counter if the first counter exceeds the first threshold value;

comparing the second counter with a second threshold value; and performing an A-key update if the second counter exceeds the second threshold value.

* * * * *